United States Patent

[11] 3,588,358

| [72] | Inventors | H. Wayne Rudmose;<br>Nelson N. Estes, Austin, Tex. |
| --- | --- | --- |
| [21] | Appl. No. | 756,256 |
| [22] | Filed | Aug. 29, 1968 |
| [45] | Patented | June 28, 1971 |
| [73] | Assignee | Tracor, Inc.<br>Austin, Tex.<br>Continuation-in-part of application Ser. No. 470,358, July 8, 1965, now abandoned. |

[54] METHOD AND APPARATUS FOR TESTING HEARING
83 Claims, 8 Drawing Figs.

[52] U.S. Cl. .................................................. 179/1N, 179/1MG
[51] Int. Cl. ............................................... H04r 27/04, A61b 5/12
[50] Field of Search.......................................... 179/1.7, 1.6; 340/405; 84/1.01

[56] References Cited
UNITED STATES PATENTS

| 2,277,660 | 3/1942 | Krom | 179/84A |
| --- | --- | --- | --- |
| 3,402,251 | 9/1968 | Bright | 84/1.01X |
| 3,388,257 | 6/1968 | Ten Eyck | 250/217 |
| 3,076,370 | 2/1963 | Williams | 179/1(.6)X |
| 2,967,909 | 1/1961 | Rice | 179/1(.6) |
| 2,534,342 | 12/1950 | Daniel | 172/1(.6) |
| 2,749,518 | 6/1956 | Shadowitz | 332/28 |
| 2,768,236 | 10/1956 | Allison | 179/1(.7)UX |
| 2,813,975 | 11/1957 | Gabor | 250/36 |
| 2,826,691 | 3/1958 | Elliott | 250/36 |
| 2,915,587 | 12/1959 | Hardesty | 171/1(MEG)UX |
| 2,985,856 | 5/1961 | Legrand | 336/135 |
| 3,105,876 | 10/1963 | Mullin et al. | 179/1(.7)UX |
| 3,392,241 | 7/1968 | Weiss et al. | 179/1(.7)UX |
| 3,395,697 | 8/1968 | Mendelson | 128/2 |
| 3,404,235 | 10/1968 | Goldberg | 179/1(.7)UX |

FOREIGN PATENTS

| 729,335 | 5/1955 | Great Britain | 179/1(MEG)UX |
| --- | --- | --- | --- |

OTHER REFERENCES

"Quick-Check Audiometer," Popular Electronics; January, 1962; p. 95

Primary Examiner—William C. Cooper
Attorneys—Arnold, Roylance, Kruger and Durkee, Tom Arnold, Donald C. Roylance, Walter Kruger, Bill Durkee, Frank S. Vaden, III, Robert A. White, John F. Lynch, Louis T. Pirkey and Jack Goldstein ABSTRACT: This invention pertains to a method of testing hearing employing a warbled sound which may be set at each of a plurality of constant amplitude levels. Apparatus especially adapted for use in such a method is portable with a self-contained battery and having electronic components for generating and modulating an electrical signal which is impressed on a transducer means. The resultant signal may be either frequency modulated about a center frequency within the audible range of the tested subject or may be a constant frequency signal within such an audible range, amplitude modulated in such a manner to simulate the warbling of a frequency modulated signal.

PATENTED JUN 28 1971

INVENTORS
H. Wayne Rudmose
Nelson N. Estes

BY Arnold, Roylance,
Kruger & Durkee    ATTORNEYS

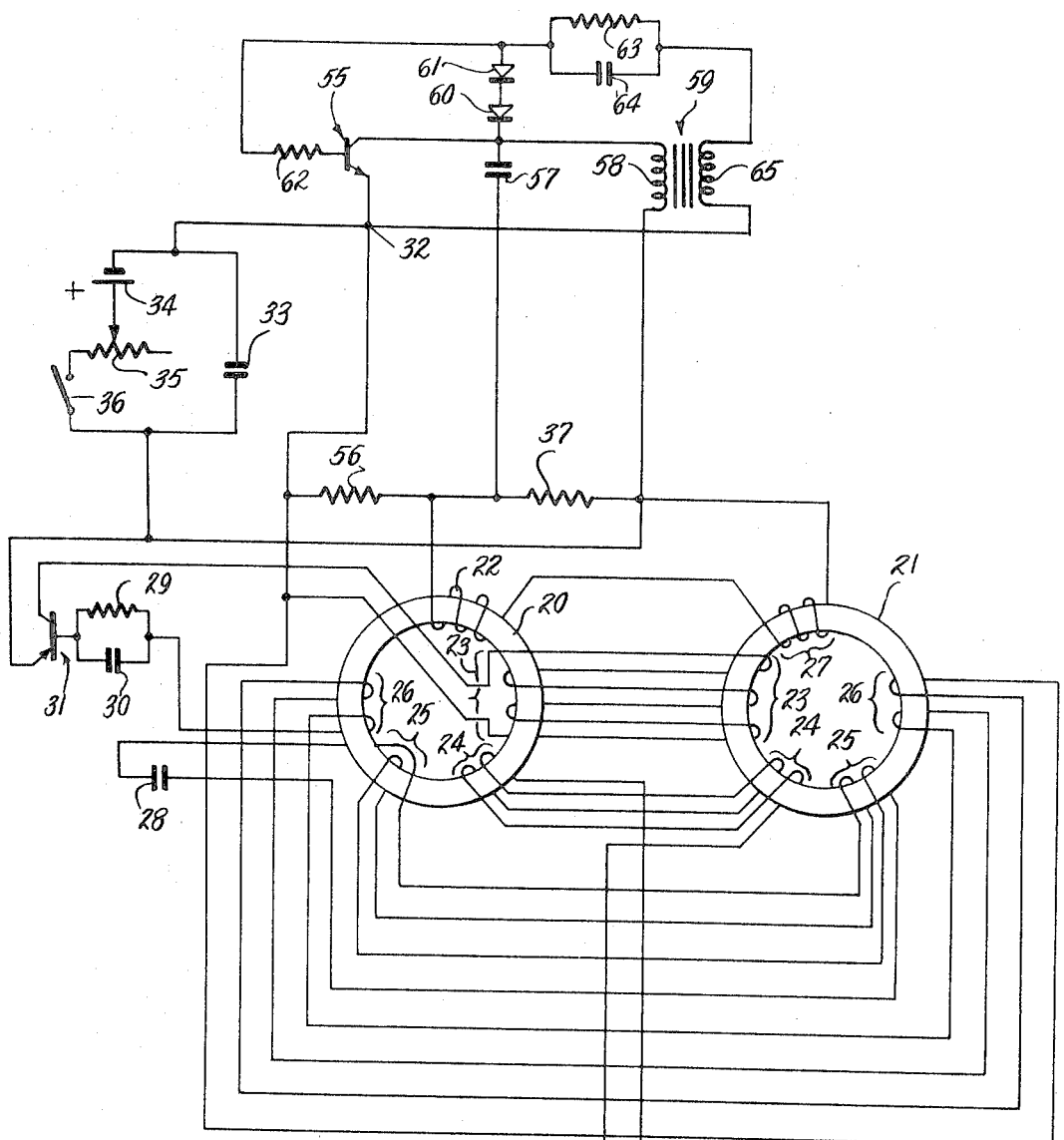
Fig. 4
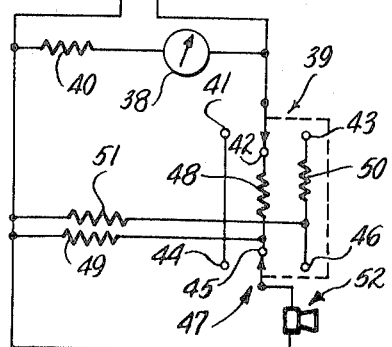

PATENTED JUN 28 1971
3,588,358
SHEET 3 OF 3
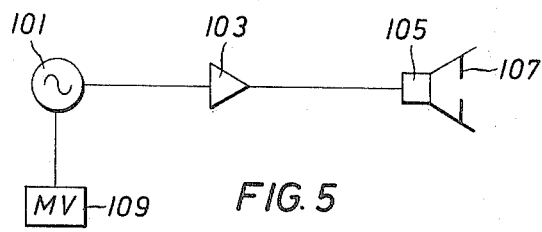
FIG. 5
FIG. 6
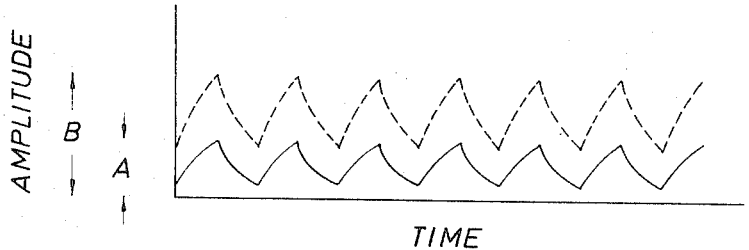
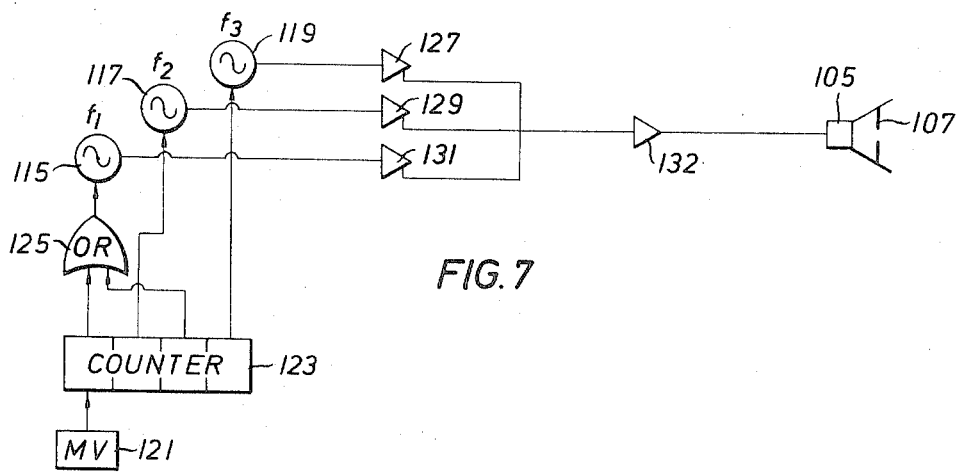
FIG. 7
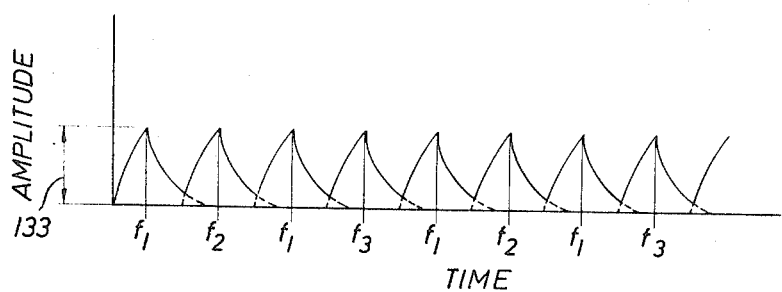
FIG. 8
H. Wayne Rudmose
Nelson N. Estes
INVENTORS
BY Arnold, Roylance,
Kruger & Durkee
ATTORNEYS

METHOD AND APPARATUS FOR TESTING HEARING

This is a continuation-in-part of application Ser. No. 470,358, filed July 8, 1965, now abandoned.

BACKGROUND OF THE INVENTION

1. Field of the invention

This invention relates to testing for hearing impairments, and more specifically to a method for testing for hearing impairments in very young children or the mentally retarded, and apparatus especially adapted for use in such a method. Also, animals may be similarly tested.

In medical circles, it is well recognized that infants should be tested for hearing defects at an early age so that, if impaired hearing is found, corrective or compensatory measures can be taken as early as possible and so that the effects of impaired hearing will not lead to an erroneous diagnosis of retarded development, for example. Such early testing is difficult, however, because of the impossibility of communicating with the infant in the manner which one might communicate with an older child or an adult. It has accordingly become common practice to provide an audible disturbance near the infant and to observe the infant for signs of response to the sound.

2. Description of the prior art

An elementary technique is to clap one's hands. If the child looks toward the source, or jumps, it may be that he has heard the clap. But it may also be that he has seen the hands move suddenly, and that he is responding to a visual, not an aural, stimulus. Even if the hands are kept out of sight, a response can be a qualitative measure only, not quantitative, as the observer cannot adjust the amplitude of the clap to find how severe an impairment is.

Efforts have therefore been made to develop apparatus for generating calibrated sound signals so that some degree of quantitative impairment measure can be made. Prior equipment has been cumbersome and expensive, and has not been capable of producing a type of sound to which an infant will readily respond in such a way that it is clear that he is hearing the sound, not just reacting to other sensory stimuli.

One prior art approach to the testing problems with which this invention deals provides an acoustic energy generator which produces a narrow band of noise, i.e., noise in which the power per unit bandwidth is uniform throughout the frequency spectrum. To produce a noise spectrum which has true uniformity throughout the required spectrum requires rather complex equipment. Also, such a noise is on the order of general background noise and does not have a quality of being particularly irritating to listen to. Such a noise may cause a reaction from some subjects and not from others because such a uniform sound may not aggravate the emotional sensibilities of many subjects.

An object of the present invention is to provide an apparatus capable of generating an audible signal having especially attention-attracting characteristics.

Another object is to provide a simple, inexpensive, and portable unit for generating a frequency modulated audible signal.

A still further object is to provide a method of testing for hearing impairment in a subject such as a very young infant wherein a frequency modulated audible signal is employed.

Yet a further object is to provide a method of testing for hearing impairment in a subject such as a very young infant wherein an amplitude modulated audible signal is subjected to a continuous succession of interruptions, such a signal creating an impression of a warbled sound similar to a frequency modulated audible signal.

With the method of the present invention, the test may be conducted in any room where the infant is comfortable and accustomed to its surroundings, or, the test may be conducted in a room selected especially for that purpose, wherein the apparatus is adjustably installed.

SUMMARY OF THE INVENTION

Stated broadly, the method of this invention comprises the steps of placing the infant or other subject in an environment relatively free from distracting stimuli, generating a frequency modulated sound (or alternately, a simulated frequency modulated sound in the form of an audio signal amplitude modulated with a succession of short pulses) at a location near the infant's ear, with the sound having a frequency in the normal audible range and a selected initial amplitude within the range of normal hearing for the subjects, and observing the subject for evidence of response to the sound signal. If no response is observed, the amplitude of the signal is increased by predetermined increments until the extent of the hearing impairment has been determined.

It has been found that the signal produced should be one which is not readily "felt" by vibrations of the type produced in physical objects in the room, and should be of a character to attract attention even at levels of low amplitude. In this context, reference to an "audible" signal will refer to a signal manifested in travelling compression waves of a frequency and amplitude suitable to evoke response in a normal auditory system, even though one having a relatively minor auditory impairment may not be able to hear it.

A signal which has been found to have the desired characteristics for testing humans is one which "warbles," i.e., a signal having a nominal center frequency in the vicinity of 3000 cycles per second, but which is varied in frequency 100 to 200 cycles per second on both sides of the center frequency at a rate of about 30—40 cycles per second. Such a signal has been found to evoke response even at the lowest amplitude levels discernible by the auditory system of the subject.

Though such an audible signal can be produced by various sound generating devices, the particular apparatus embodiment herein disclosed has the advantages of light weight, portability, freedom from dependence on local sources of electrical power, and ease of inconspicuous use.

Briefly, one embodiment of the apparatus of this invention includes a transducer having a speaker horn of the public address system type, a case mounted to the flared horn portion, and a handle. A battery and all the related electronic circuitry for generating the required signal is contained within the case, and a trigger operated switch is built into the handle. The rear face of the case supports and displays a calibration meter, the adjusting knobs, and an access cover for the battery compartment, positioned for easy viewing and access by the operator.

Alternatively, another embodiment of suitable apparatus of this invention incorporates an audible sound source amplitude-modulated with a series of short pulses and an electromagnetically driven diaphragm driven diaphragm enclosed at the rear and with an enclosure at the front with a fixed or variable size opening, such as a camera-type iris, spaced approximately 1 inch in front of the diaphragm. Such an apparatus would produce a simulated frequency modulated signal which would actually be a constant frequency signal which would actually be a constant frequency modulated signal which would a actually be a constant frequency subjected to or modulated by a pulsating sequence of interruptions. Such action produces a sound spectrum having a center frequency and harmonic components of the modulating sequence of interruptions on either side thereof and with the entire spectrum increasing and decreasing in volume (simulated "warbling") with the interruptions. Changing the size of the iris-type opening provides the means for adjusting the amplitude of the produced sound as desired for a subsequent test.

In order that the manner in which the foregoing and other objects are attained in accordance with the invention can be understood in detail, particularly advantageous embodiments thereof will be described with reference to the accompanying drawings, which form a part of this specification, and wherein;

FIG. 4 is a schematic diagram of the electrical circuitry usable to generate a signal of the type shown in FIG. 3;

FIG. 5 is a block diagram of an alternate electrical circuit usable to generate an alternate signal used in the subject method;

FIG. 6 is a graphic representation of the signal produced by the circuit shown in FIG. 5;

FIG. 7 is a block diagram of yet another electrical circuit usable to generate another signal used in the subject method; and FIG. 8 is a graphic representation of the signal produced by the circuit shown in FIG. 7.

DESCRIPTION OF THE PREFERRED EMBODIMENTS

Figure 1:
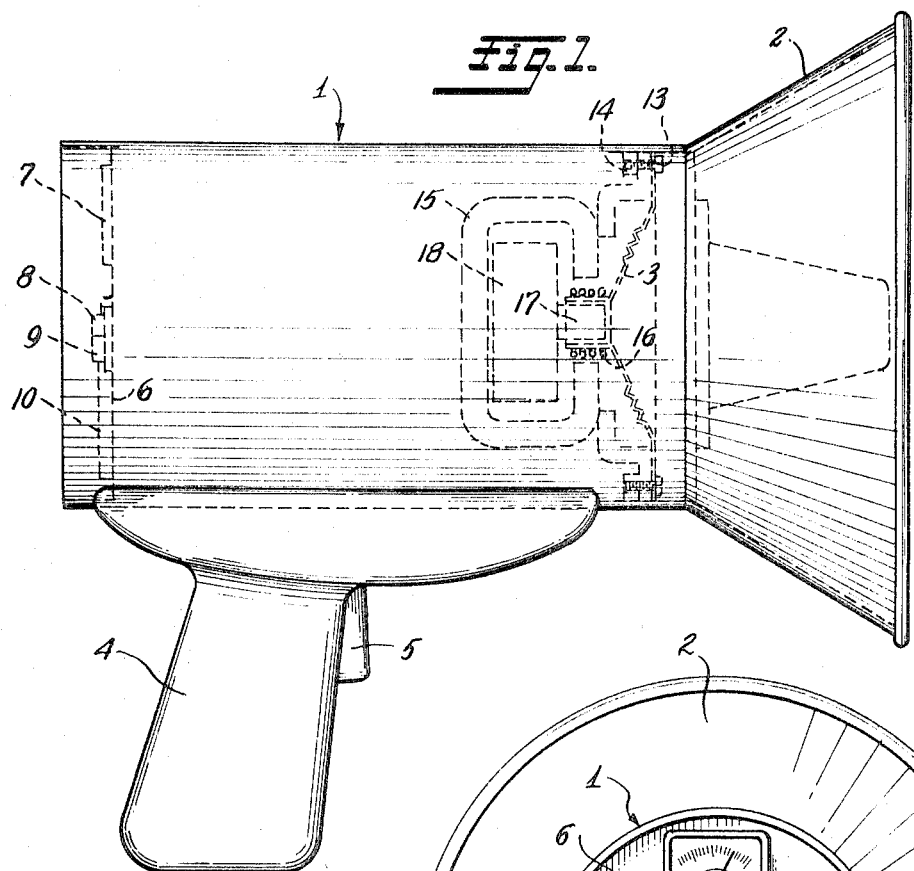
FIG. 1 is a side elevation of an apparatus incorporating the subject invention.

Referring now to the drawings, and first to FIG. 1, the apparatus embodiment of the invention here illustrated comprises a substantially cylindrical case 1 terminating in an outwardly flaring frustoconical horn 2 having a transducer cone 3 for driving the horn. Cone 3 is attached to frame 14 of housing 1 via bolts 13. The transducer cone is connected in a conventional manner to voice coil 16 about pole piece 17 of permanent magnet 18 located within magnetic shell 15, which, in turn, is welded to the frame, holding cone 3 in place. Voice coil 16 is located in the air gap between magnetic shell 15 and pole piece 17.

Hence, the assembly is constructed in the manner of a conventional public address system transducer, operative to convert electrical signals supplied thereto into sound waves. The horn and cone portion of the apparatus is a conventional transducer means, and therefore will not be described in greater detail herein.

A handle 4 of the pistol grip type is secured to the lower portion of the case 1, and is provided with a trigger 5 arranged to operate a conventional normally open switch contained within the handle 4. A panel 6 is recessed into the rear of the case 1, and holds a calibrated meter 7, a calibrating knob 8, a level adjusting knob 9, and a battery access cover 10, these being shown more clearly in FIG. 2. A bolt or other fastener 11 is provided to hold the panel 6 in its recessed position in case 1. The meter 7 and knobs 8 and 9 are mounted in suitable apertures in panel 6, and are connected to the appropriate circuit elements contained within the case 1 and described in greater detail hereinafter. Cover 10 is externally threaded and mates with internal threading in a hole provided in panel 6. A recessed slot 12 is provided in cover 10 so that the cover may easily be removed with the aid of a coin or similar device to permit easy replacement of the battery contained therein.

The apparatus is constructed to produce an audible signal having a "warbling" effect, which may be compared with the tremolo in the voice of a singer or in the sound of a musical instrument when the frequency thereof is varied. For example, when a violinist draws his bow across a string of his instrument, simultaneously holding the fret end of the string firmly between a finger and the fret board, a signal of constant frequency is produced. However, if the violinist causes his hand to oscillate in such fashion that the point of pressure moves longitudinally along the string, the frequency of oscillation of the string varies, and a frequency modulated signal is produced. The signal produced by the present apparatus is somewhat similar, although the frequency excursions are advantageously somewhat greater than those produced by the violinist. This is illustrated in the graph of FIG. 3, in which the abscissa is in units of time and the ordinate is in units of frequency, the frequency scale being broken and compressed to allow a larger representation of the portion of interest.

Figure 3:
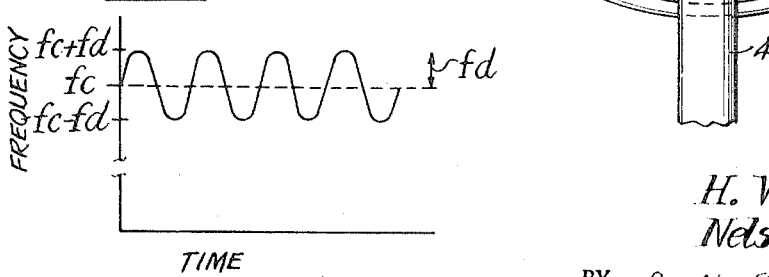
FIG. 3 is a frequency/time graph of a sound signal used in the subject method and produced by the apparatus of FIG. 1.

In FIG. 3, the symbol $f_c$ and the dotted line extending therefrom parallel to the abscissa indicates the center frequency about which the signal is modulated. The symbol $f_d$ indicates the extent of deviation in cycles per second. Thus, the signal will be seen to oscillate between the limits $f_c + f_d$ and $f_c - f_d$. A typical apparatus in accordance with the invention provides a signal having a center frequency of about 3000 cycles per second, with a deviation of approximately 150 cycles per second, the excursion limits therefore being 3,150 cycles per second, and 2,850 cycles per second.

It should be noted that during this excursion no modification of amplitude occurs, but that the total change is one of frequency. Thus, once an amplitude level has been established, as will be discussed below, the frequency modulation signal proceeds at that amplitude. This is of particular importance in testing response of an auditory system, since it is essential to test at known effective stimulus or effective amplitude levels, preferably to begin at a relatively low amplitude level and, if no symptoms of response are detected, to proceed stepwise to higher amplitude levels.

Referring now to FIG. 4, the circuitry used to produce the electrical signal provided to the transducer 3 employs, in general terms, a saturable core reactor oscillator, a modulating circuit, and an attenuator selector. The saturable reactor includes a pair of substantially identical toroidal cores 20 and 21, each having a plurality of windings. In practice, the cores are placed in contiguous relationship with their axes aligned, in the manner of one doughnut placed on top of another. However, they are shown separated for ease of illustration. Each core holds five windings, four of which are wound simultaneously around both cores. The fifth winding is wrapped first on one core and then on the other core, in the proper direction to make the windings operate in series opposing relationship with respect to voltage introduced into the winding from the other four windings. On core 20, the individually wrapped winding is winding 22, while windings 23—26 are wound simultaneously around both cores. On core 21, winding 27 is individually wrapped on core 21, windings 23—26 being given the same designation as on core 20.

The two ends of winding 25 are connected to the two terminals of a capacitor 28, which is selected to form a parallel resonant circuit, resonant at frequency $f_c$ plus or minus modulating deviation. One end of winding 26 is connected to a parallel circuit including a resistor 29 and a capacitor 30, the other terminal of the parallel circuit being connected to the base electrode of a conventional PNP transistor indicated generally at 31. The other end of winding 26 is connected to one end of winding 23, and to a junction point 32. The other end of winding 23 is connected to the collector of transistor 31. The emitter of transistor 31 is connected to one end of a DC supply circuit including a capacitor 33, which is in parallel with a series circuit including a 1.5 volt dry cell battery 34, a variable resistance 35, and a switch 36. Switch 36 is mechanically connected to trigger 5 on handle 4, previously discussed with reference to FIG. 1. The negative terminal of battery 34 and one terminal of capacitor 33 are connected to junction 32.

The emitter of transistor 31 is also connected to one end of resistor 37 and to one end of winding 27 on core 21. Resistor 37 is in parallel with windings 22 and 27, in series on cores 20 and 21, and is also connected to the modulator portion of the circuit to be discussed later.

Winding 24 is connected to the output circuit which includes the attenuators, the transducer, and the calibration meter. One end of winding 24 is connected to one terminal of a conventional voltmeter 38 and also to the movable contact of a single pole, three-position selector switch indicated generally at 39. Voltmeter 38 is in series with a resistance 40, the other end of resistance 40 being connected to the other end of winding 24. The fixed contacts of switch 39, denoted by the numerals 41, 42 and 43, are connected to three similar fixed contacts 44, 45 and 46 of a second single pole, three-position selector switch indicated generally at 47. Contacts 41 and 44 are connected directly together, but contacts 42 and 45 are connected by an attenuating resistor 48 which, in combination with parallel resistance 49, forms an attenuating network commonly known as an L-pad. Contacts 43 and 36 are similarly connected via a resistance 50, resistance 50 in combination with parallel resistance 51 forming a second attenuating L-pad. The movable contact of switch 47 is connected to one terminal of the transducer indicated generally at 52, the other terminal of which is connected to the other terminals of resistance 40, 51 and 49 and to the other side of winding 24.

The modulating circuit includes a conventional NPN transistor indicated generally at 55, the emitter of which is connected to junction 32 and to one end of a resistance 56, the other end of which is connected to one end of resistance 37 and to one terminal of a capacitor 57. The collector of transistor 55 is connected to the other terminal of capacitor 57 and also to one end of a primary winding 58 of an inductor comprising a coupling transformer with an air gap in the core, indicated generally at 59. The other end of winding 58 is connected to the end of resistor 37 to which winding 27 is connected. The collector of transistor 55 is also connected to the cathode of a conventional semiconductor diode 60, which is in series with a similar diode 61.

The base of transistor 55 is connected via a resistance 62 to the anode of diode 61, and to one end of a parallel circuit including a resistance 63 and a capacitor 64. The other end of the parallel circuit is connected to one end of the secondary winding 65 of transformer 59. The other end of winding 65 is connected to junction 32.

The oscillator portion of the circuit including transistor 31 utilizes the inductance of the two-core toroidal transformer including cores 20 and 21, and the capacitance of capacitor 28 to perform the oscillating function. The feedback circuit necessary to sustain oscillation can be traced from the collector of transistor 31 to the cores 20 and 21 via winding 23, and, via winding 26 through the parallel circuit including resistor 29 and capacitor 30, to the base of transistor 31. In operation, the values are selected such that cores 20 and 21 are biased midway of their saturation points by current passing through resistor 56 with no other outside influences. Windings 22 and 27, being wound separately in series on the two cores, have low resistance values compared to resistor 37 and have substantially no effect on the operation of the oscillator circuit unless current is passed through the winding from some outside source. The current provided to accomplish this is the current from the modulating portion of the circuit.

Capacitor 57 and winding 58 of transformer 59 are selected to resonate at approximately 35 cycles, the inductance of windings 22 and 27 being negligibly small. This frequency establishes the rate of frequency modulation of the output signal. The modulator circuit, including transistor 55, is also a form of resonant circuit, the feedback path being from the collector of transistor 55 through transformer 59, through the parallel circuit including resistor 63 and capacitor 64, and through resistor 62 to the base of transistor 55. As this circuit oscillates at the 35-cycle rate, more or less current is allowed to flow from the negative battery terminal through resistance 56, through the parallel circuit including resistance 37 and windings 22 and 27, and back to the positive side of bat battery 34 through switch 36 and variable resistance 35. The effect of the direct current passing through windings 22 and 27 is to drive the cores 20 and 21 further into or further out of saturation, thereby altering the inductance of the oscillator circuit including the toroids and capacitor 28, and thus varying the frequency of the oscillator. The absolute value of the current passing through the windings 22 and 27 is a function of the value of resistance 37, as will be recognized by one skilled in the art. Thus, initial selection of the value of resistance 37 will determine the scope of the inductance change effected by the modulator circuit, and thus the scope of the frequency modulation.

Resistance 29 is included to control the self-bias of the base circuit of transistor 31 to provide a more sinusoidal waveform. Capacitor 30 is selected in size to ensure oscillation when the system is first energized and to bypass resistor 29. Variable resistance 35 is included to allow adjustment of the output level. The movable wiper of resistor 35 is mechanically coupled to the calibrate knob 8, previously discussed with reference to FIG. 2. Thus, for an initial setting, knob 8 may be rotated, thereby moving the wiper of resistor 35, until a desired voltage level appears on voltmeter 38. This adjustment prevents error resulting from the normal degeneration of the dry cell with time.

Diodes 60 and 61 are an option feature included to provide essentially constant magnitude of he feedback voltage occurring in the modulator circuit by limiting the peaks occurring in that circuit. Resistors 62 and 63 are provided for bias and wave-shaping purposes.

Turning now to the output circuit it will be seen that the movable contacts of switches 39 and 47 are mechanically coupled to move together. With the movable wipers in contact with fixed contacts 41 and 44, a direct connection is provided between the output of the oscillator circuit and the transducer 52. With the switches in either of the other two positions, the output signal is attenuated in a manner familiar to one skilled in the art, the degree of attenuation being dependent upon the value of the resistances selected. In this embodiment, it is contemplated that the attenuation provided by resistors 48 and 49 would be less than the at provided by resistors 50 and 51, so that as the switches are moved from left to right, as shown in FIG. 1, the signal output would increase in stepwise fashion. It is therefore necessary only to calibrate the system in the low attenuation, or high signal output, position by adjusting resistance 35 to an appropriate reading on voltmeter 38. Thereafter, the L-pad attenuators provide predetermined attenuation ratios as the switches are moved.

In use, it is contemplated that, with the trigger depressed to close switch 36, the calibrate knob coupled to the wiper of resistor 35 is tuned until the indication on voltmeter 38 is at the preselected position on the meter. During this operation, the output arm may be muffled in a soft-sound-absorbent material, such as a pillow, to absorb the output. The apparatus may then be held at the calibration distance, for example at a distance of 10 inches from the subject's ears, but presumably out of the range of his vision, while the trigger is depressed several times for short intervals. If no symptoms of having heard the signal appear, the process is repeated as required for other preselected positions of the attenuator.

Now referring to FIG. 5, an alternate circuit is shown. Generally, an AC oscillator 101, which may be a pulsed oscillator or equivalent means for producing a sound in the frequency range of normal hearing for the subject being tested, applies a constant frequency signal at substantially a constant amplitude to a conventional power amplifier 103 having an output capable for electromagnetically driving a diaphragm of an electroacoustical transducer 105 at a volume suitable for testing in the manner herein described. The volume of the transducer is then controlled by the opening of iris 107 placed in front of the diaphragm to be explained more fully hereinafter.

A suitable pulsed oscillator is shown in FIG. 16—21 of "-Pulse and Digital Circuits," Millman and Taub, Mcgraw-Hill Book Co., copyright 1956. A pulsed oscillator of this type is one which is normally quiescent but which can be turned on for the timed duration of a gating waveform. Free-running or astable multivibrator 109 is connected to gate oscillator 101 in the manner shown in Millman and Taub, op. cit., at a rate of about 20 Hz. to 100 Hz.

Shown in FIG. 6 is an amplitude-versus time diagram of the signal produced by the circuit just described. The output signal exponentially builds up when it is gated to oscillate by the multivibrator until it just about reaches its peak, at which time the oscillator is cut off, causing the signal amplitude to decay exponentially to a low value. The gate is then again provided to cause the amplitude of the oscillator to build up once again.

It should be noted that the waveform "warbles" between a low amplitude value and a predetermined peak amplitude level A. There is a correlation between the amplitude or level of the signal and the stimulus effect on the tested subject. Should the subject not respond with the amplitude set at level A, then the output from the transducer may be set at a level by iris 107 to produce a peak amplitude level B, and the waveform shown in dotted lines in FIG. 6.

The signal from the FIG. 5 circuit very closely resembles the signal produced by the circuit shown in FIG. 4. In the FIG. 4 embodiment there is a changing of the peak signal across the sound spectrum or band of frequencies of interest with the constantly changing phase of the modulating signal. The spectrum from the FIG. 5 circuit covers approximately this same band of frequencies, and includes harmonically developed side band signals throughout the spectrum. There is no phase shift of each individual frequency within the spectrum, as with the FM signal, but there is a similar effective condition for creating an audio stimulus in that each of these individual frequencies increases and decreases "warbles" over a period of time just as any one frequency in the FM signal spectrum does over a period of time. In face, when viewed as a spectrum little difference can be detected between the signal from the FIG. 4 circuit and the signal from the FIG. 5 circuit.

Figure 2:
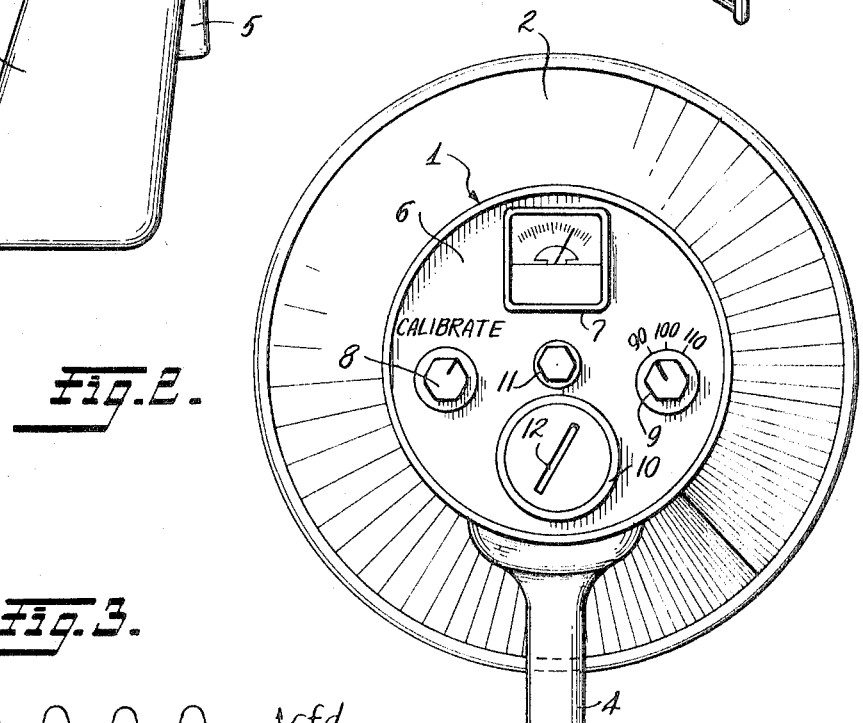
FIG. 2 is a rear elevation of the apparatus of FIG. 1.

A convenient device that may be used as the basic electroacoustical transducer just described is Sonalert's Electronic Audible Signal by the Mallory Distributor Products Company, a division of P. R. Mallory & Co., Inc. Such a device may be housed with a suitable pulsator or modulator and have secured thereto a suitably adjustable camera-type iris for operation in the manner just described. The iris-type opening may be triangularly shaped, for example, and have operating therewith a slide cover for varying the exposed dimension of the opening from its apex to its widest part. Alternatively, a plurality of different sized openings may be included in a rotatable, two-disc structure, such that only one opening is exposed or operationally effective at a time. It is readily apparent that the entire apparatus may be housed conveniently in a housing no larger than an ordinary flashlight case, or in any other convenient form, such as shown in FIGS. 1 and 2.

Basically, the Sonalert signal device comprises an elongate enclosure having an electromagnetically driven diaphragm approximately three-fourths inch in diameter. A camera-type iris is included in the end of an extension cylinder that is attachable to the main enclosure beyond the diaphragm. It is convenient to make this extension cylinder to be coupled with the enclosure through a threaded connection. Normally, the spacing of the iris with respect to the diaphragm is on the order of 1 inch. The modulated sound produced from the device is very rich in at least second and third harmonic content of the modulating frequency, differing from the appearance of an FM signal principally by the amplitude relations of the upper and lower side bands. However, since the effectiveness of the system does not depend critically upon these side bands relationships in the testing application herein described, the difference in the character of the sound produced by the FM system device previously described and the AM system device appear to be of little importance.

The volume control is the mechanical opening control of the iris, which may be varied from about one-eighth inch diameter opening to about one-half inch in diameter.

In essence, the produced signal from FIG. 5, as shown, in FIG. 6, may be thought of as being modulated with a succession of short pulses produced by a multivibrator. Of course, any other means for modulating the oscillator signal in a manner to establish a repetitive cyclical sequence reaching a constant amplitude during each modulation cycle may be employed. To this extent, it may be seen that the signal produced in the FIG. 5 circuit is similar to that produced from the FIG. 4 circuit.

Also, it should be noted that whereas one frequency could be selected, an oscillator means producing a band of frequencies in the hearing spectrum (even a band covering the entire spectrum) could be employed. Moreover, the oscillator may be made adjustable and an attenuator control may be included in amplifier 103 and made selectable in step fashion, rather than continuous. Of course, suitable metering may also be provided, as with the previously discussed embodiment.

The FIG. 7 circuit is another version of the circuit shown in FIG. 5. In this embodiment the oscillator means actually includes three oscillators 115, 117 and 119, respectively, for producing signals $f_1$, $f_2$ and $f_3$, all within the hearing range of a normal subject. It may be assumed that $f_1$ is located midway between frequencies $f_2$ and $f_3$.

Connected to oscillators 115, 117 and 119 are respectively OR gate 125, the second stage of counter 123 and the fourth stage of counter 123. Connected to the input of OR gate 125 are the first and third stages of counter 123. Connected to initiate the counter is a free-running or astable multivibrator 121, similar to multivibrator 109 shown in FIG. 5. The sequence of gating of the oscillators is four steps: namely, oscillator 115 ($f_1$) by the first stage of counter 123,
oscillator 117 ($f_2$) by the second stage of counter 123,
oscillator 115 ($f_1$) by the third stage of counter 123 and
oscillator 119 ($f_3$) by the fourth stage of counter 123.

The outputs of the respective oscillators are connected to isolation circuits, such as emitter followers 127, 129 and 131, respectively. The outputs from these isolation circuits are then connected together and to a power amplifier 133, which in turn is connected to an electroacoustic transducer 105, as with the FIG. 5 embodiment.

FIG. 8 shows the output waveform for the FIG. 7 embodiment. It will be noted that the setting of the peak amplitude level 133 is constant; only the sequence of signals presented to the output transducer is changed as determined by he counter and oscillator circuit just described. That is, the sequence goes from $f_1$ to $f_2$, to $f_1$, to $f_3$, and again to $f_1$. Hence, each time there is an output from the multivibrator, not only is there an interruption in the signal to cause a warbling effect, as for the FIG. 5 embodiment, but there is a selection of a new one of of frequencies $f_1$, $f_2$ and $f_3$, providing complete testing of the subject. Of course, any convenient means of electronic switching and selection could be used, as well as any number of oscillators for producing different frequencies. Also, as with the FIG. 5 embodiment, the amplitude level 133 may be changed to a different level in the testing procedure by changing the size of iris opening 107.

Finally, for simplicity the !fig. 5 and FIG. 7 circuits have been shown without a power supply, switches and meters, and similar ancillary equipment, all of which may be provided in the manner described for the FIG. 4 embodiment. For instance, a switch 36 from a power supply may be connected to the trigger of the device to provide a suitable means for initiating a test. The iris opening may also be connected to a calibrated knob, which knob may be mechanically detented if desired, to show the effective stimulus or peak amplitude of the test signal.

The use of the apparatus has generally been discussed with respect to infants. It should also be recognized that there are other subjects, such as children and adults, who for some reason are incapable of communicating and who may be aurally tested as described above.

One such group of subjects in this category are the mentally retarded who are incapable of comprehending instructions for testing with different, more complex type of equipment. What may be diagnosed as mental retardation in an older child may only be a lack of recognizing that the child is deaf. Such a subject can readily be tested as above even though he is apparently uncommunicative.

Also, other infirmities such as dumbness or paralysis may prevent a particular subject from communicating normally, but would not prevent aural testing with the device described.

Finally, the hearing in animals may be tested with the described device, there being no need for communication other than what may be observed through the reactions of the animals during testing.

While several advantageous embodiments have been chosen to illustrate the invention, it will be understood by those skilled in the art that other embodiments are available which differ radically from the embodiments described. For instance, completely different oscillators may be imagined, as well as different schemes of real or apparent frequency modulation. Also, of course, various changes and modifications can be made in the described embodiments without departing from the scope of the invention.

We claim:

1. A method of determining hearing impairment in a subject not having the ability to intelligently communicate the fact of such impairment, comprising generating in the vicinity of the subject a continuous, repetitive sound signal having maximum and minimum peaks of substantially constant respective amplitudes occurring at least cyclically and having between selected peaks frequencies audibly discernibly varying about 100 to 200 cycles per second from a predetermined frequency within the hearing range of a normal subject, whereby the subject may be observed for symptoms of aural response.

2. The method of claim 1 wherein the predetermined frequency is about 3000 cycles per second.

3. The method of claim 1 wherein the frequencies audibly discernibly varying from the predetermined frequency vary about 100 to 200 cycles per second above and below the predetermined frequency.

4. The method of claim 1 further comprising relatively isolating the subject from unusual distracting visual or audible stimuli before generating the signal and during the signal generation.

5. The method of claim 1 further comprising increasing the amplitudes of the maximum and minimum peaks when there are no symptoms of aural response by the subject.

6. The method of claim 2 wherein the frequencies audibly discernibly varying from the predetermined frequency vary about 100 to 200 cycles per second above and below the predetermined frequency.

7. The method of claim 2 further comprising relatively isolating the subject from unusual distracting visual or audible stimuli before generating the signal and during the signal generation.

8. The method of claim 2 further comprising increasing the amplitudes of the maximum and minimum peaks when there are no symptoms of aural response by the subject.

9. The method of claim 3 further comprising relatively isolating the subject from unusual distracting visual or audible stimuli before generating the signal and during the signal generation.

10. The method of claim 3 further comprising increasing the amplitudes of the maximum and minimum peaks when there are no symptoms of aural response by the subject.

11. The method of claim 4 further comprising increasing the amplitudes of the maximum and minimum peaks when there are no symptoms of aural response by the subject.

12. The method of claim 6 further comprising relatively isolating the subject from unusual distracting visual or audible stimuli before generating the signal and during the signal generation.

13. The method of claim 6 further comprising increasing the amplitudes of the maximum and minimum peaks when there are no symptoms of aural response by the subject.

14. The method of claim 7 further comprising increasing the amplitudes of the maximum and minimum peaks when there are no symptoms of aural response by the subject.

15. The method of claim 9 further comprising increasing the amplitudes of the maximum and minimum peaks when there are no symptoms of aural response by the subject.

16. The method of claim 12 further comprising increasing the amplitudes of the maximum and minimum peaks when there are no symptoms of aural response by the subject.

17. The method of claim 6 wherein the signal is a frequency modulated sinusoidal signal.

18. The method of claim 6 wherein the frequencies audibly discernibly varying above and below the predetermined frequency vary sinusoidally.

19. The method of claim 16 wherein the frequencies audibly discernibly varying above and below the predetermined frequency vary sinusoidally.

20. The method of claim 12 wherein the signal is a sinusoidally frequency modulated sinusoidal signal.

21. The method of claim 13 wherein the signal is a sinusoidally frequency modulated sinusoidal signal.

22. The method of claim 6 wherein the signal includes a constant frequency portion sinusoidally increasing in amplitude from a minimum peak to a maximum peak.

23. The method of claim 6 wherein the signal includes a varying frequency portion exponentially decreasing in amplitude from a maximum peak to a minimum peak.

24. The method of claim 22 wherein the signal includes a varying frequency portion exponentially decreasing in amplitude from a maximum peak to a minimum peak.

25. The method of claim 12 wherein the signal includes a constant frequency portion portion sinusoidally increasing in amplitude from a minimum peak to a minimum peak and a varying frequency portion exponentially decreasing in amplitude from a maximum peak to a minumum peak.

26. The method of claim 13 wherein the signal includes a constant frequency portion sinusoidally increasing in amplitude from a minimum peak to a maximum peak and a varying frequency portion exponentially decreasing in amplitude from a maximum peak to a minimum peak.

27. A method of determining hearing impairment in a subject not having the ability to intelligently communicate the fact of such impairment, comprising generating in the vicinity of the subject a continuous, repetitive sound signal having maximum and minimum peaks of repetitive sound signal having maximum and minimum peaks of substantially constant respective amplitudes occurring at least cyclically and having between selected peaks frequencies audibly discernibly varying from a predetermined frequency within the hearing range of a normal subject, wherein the signal includes a constant frequency portion sinusoidally increasing in amplitude from a minimum peak to a maximum peak, whereby the subject may be observed for symptoms of aural response.

28. The method of claim 27 wherein the signal includes a varying frequency portion exponentially decreasing in amplitude from a maximum peak to a minimum peak.

29. The method of claim 28 further comprising relatively isolating the subject from unusual distracting visual or audible stimuli before generating the signal and during the signal generation.

30. The method of claim 28 further comprising increasing the amplitudes of the maximum and minimum peaks when there are no symptoms of aural response by the subject.

31. A method of determining hearing impairment in a subject not having the ability to intelligently communicate the fact of such impairment, comprising generating in the vicinity of the subject a continuous, repetitive sound signal having maximum and minimum peaks of substantially constant respective amplitudes occurring at least cyclically and having between selected peaks frequencies audibly discernibly varying from a predetermined frequency within the hearing range of a normal subject, wherein the signal includes a varying frequency portion exponentially decreasing in amplitudes from a maximum peak to a minimum peak, whereby the subject may be observed for symptoms of aural response.

32. Apparatus for determining hearing impairment in a subject not having the ability to intelligently communicate the fact of such impairment, comprising means for generating in the vicinity of the subject a continuous, repetitive sound signal having maximum and minimum peaks of substantially constant respective amplitudes occuring at least cyclically and having between selected peaks frequencies audibly discernibly varying from a predetermined frequency within the hearing range of normal subject; and means for containing the generating means in a self-contained, portable, hand-foldable unit, whereby the subject may be observed for symptoms of aural response.

33. The apparatus of claim 32 wherein the predetermined frequency is about 3000 cycles per second.

34. The apparatus of claim 32 wherein the frequencies audibly discernibly varying from the predetermined frequency vary above and below the predetermined frequency.

35. The apparatus of claim 32 wherein the frequencies audibly discernibly varying from the predetermined frequency vary about 100 to 200 cycles per second from the predetermined frequency.

36. The apparatus of claim 32 further comprising means for relatively isolating the subject from unusual distracting visual or audible stimuli before generating the signal and during the signal generation.

37. The apparatus of claim 32 further comprising means for increasing the amplitudes of the maximum and minimum peaks.

38. The apparatus of claim 33 wherein the frequencies audibly discernibly varying from the predetermined frequency vary above and below the predetermined frequency.

39. The apparatus of claim 33 wherein the frequencies audibly discernibly varying from the predetermined frequency vary about 100 to 200 cycles per second from the predetermined frequency.

40. The apparatus of claim 33 further comprising means for relatively isolating the subject from unusual distracting visual or audible stimuli before generating the signal and during the signal generation.

41. The apparatus of claim 33 further comprising means for increasing the amplitudes of the maximum and minimum peaks.

42. The apparatus of claim 34 wherein the frequencies audibly discernibly varying from the predetermined frequency vary about 100 to 200 cycles per second above and below the predetermined frequency.

43. The apparatus of claim 35 further comprising means for relatively isolating the subject from unusual distracting visual or audible stimuli before generating the signal and during the signal generation.

44. The apparatus of claim 34 further comprising means for increasing the amplitudes of the maximum and minimum peaks.

45. The apparatus of claim 35 further comprising means for relatively isolating the subject from unusual distracting visual or audible stimuli before generating the signal and during the signal generation 46. The apparatus of claim 35 further comprising means for increasing the amplitudes of the maximum and minimum peaks.

47. The apparatus of claim 36 further comprising means for increasing the amplitudes of the maximum and minimum peaks.

48. The apparatus of claim 38 wherein the frequencies audibly discernibly varying from the predetermined frequency vary about 100 to 200 cycles per second above and below the predetermined frequency.

49. The apparatus of claim 38 further comprising means for relatively isolating the subject from unusual distracting visual or audible stimuli before generating the signal and during the signal generation.

50. The apparatus of claim 38 further comprising means for increasing the amplitudes of the maximum and minimum peaks.

51. The apparatus of claim 39 further comprising means for relatively isolating the subject from unusual distracting visual or audible stimuli before generating the signal and during the signal generation.

52. The apparatus of claim 39 further comprising means for increasing the amplitudes of the maximum and minimum peaks.

53. The apparatus of claim 40 further comprising means for increasing the amplitudes of the maximum and minimum peaks.

54. The apparatus of claim 42 further comprising means for relatively isolating the subject from unusual distracting visual or audible stimuli before generating the signal and during the signal generation.

55. The apparatus of claim 42 further comprising means for increasing the amplitudes of the maximum and minimum peaks.

56. The apparatus of claim 43 further comprising means for increasing the amplitudes of the maximum and minimum peaks.

57. The apparatus of claim 45 further comprising means for increasing the amplitudes of the maximum and minimum peaks.

58. The apparatus of claim 48 further comprising means for relatively isolating the subject from unusual distracting visual or audible stimuli before generating the signal and during the signal generation.

59. The apparatus of claim 48 further comprising means for increasing the amplitudes of the maximum and minimum peaks.

60. The apparatus of claim 49 further comprising means for increasing the amplitudes of the maximum and minimum peaks.

61. The apparatus of claim 51 further comprising means for increasing the amplitudes of the maximum and minimum peaks.

62. The apparatus of claim 54 further comprising means for increasing the amplitudes of the maximum and minimum peaks.

63. The apparatus of claim 58 further comprising means for increasing the amplitudes of the maximum and minimum peaks.

64. The apparatus of claim 32 wherein the signal is a frequency modulated sinusoidal signal.

65. The apparatus of claim 52 wherein the frequencies audibly discernibly varying from the predetermined frequency vary sinusoidally.

66. The apparatus of claim 64 wherein the frequencies audibly discernibly varying from the predetermined frequency vary sinusoidally.

67. The apparatus of claim 48 wherein the signal is a frequency modulated sinusoidal signal.

68. The apparatus of claim 48 wherein the frequencies audibly discernibly varying above and below the predetermined frequency vary sinusoidally.

69. The apparatus of claim 67 wherein the frequencies audibly discernibly varying above and below the predetermined frequency vary sinusoidally.

70. The apparatus of claim 36 wherein the signal is a sinusoidally frequency modulated sinusoidal signal.

71. The apparatus of claim 58 wherein the signal is a sinusoidally frequency modulated sinusoidal signal.

72. The apparatus of claim 37 wherein the signal is a sinusoidally frequency modulated sinusoidal signal.

73. The apparatus of claim 59 wherein the signal is a sinusoidally frequency modulated sinusoidal signal.

74. The apparatus of claim 32 wherein the signal includes a constant frequency portion increasing in amplitude from a minimum peak to a maximum peak.

75. The apparatus of claim 32 wherein the signal includes a varying frequency portion exponentially decreasing in amplitude from a maximum peak to a minimum peak.

76. The apparatus of claim 74 wherein the signal includes a varying frequency portion exponentially decreasing in amplitude from a maximum peak to a minimum peak.

77. The apparatus of claim 48 wherein the signal includes a constant frequency portion increasing in amplitude from a minimum peak to a maximum peak.

78. The apparatus of claim 48 wherein the signal includes a varying frequency portion exponentially decreasing in amplitude from a maximum peak to a minimum peak.

79. The apparatus of claim 77 wherein the signal includes a varying frequency portion exponentially decreasing in amplitude from a maximum peak to a minumum peak.

80. The apparatus of claim 36 wherein the signal includes a constant frequency portion increasing in amplitude from a minimum peak to a maximum peak and a varying frequency portion exponentially decreasing in amplitude from a maximum peak to a minimum peak.

81. The apparatus of claim 58 wherein the signal includes a constant frequency portion increasing in amplitude from a minimum peak to a maximum peak and a varying frequency portion exponentially decreasing in amplitude from a maximum peak to a minimum peak.

82. The apparatus of claim 37 wherein the signal includes a constant frequency portion increasing in amplitude from a minimum peak to a maximum peak and a varying frequency portion decreasing in amplitude from a maximum peak to a minimum peak.

83. The apparatus of claim 59 wherein the signal includes a constant frequency portion increasing in amplitude from a minimum peak to a maximum peak and a varying frequency portion decreasing in amplitude from a maximum peak to a minimum peak.

UNITED STATES PATENT OFFICE
CERTIFICATE OF CORRECTION

Patent No. 3,588,358    Dated June 28, 1971

Inventor(s) H. Wayne Rudmose and Nelson N. Estes

It is certified that error appears in the above-identified patent and that said Letters Patent are hereby corrected as shown below:

Column 2, line 51, "driven diaphragm", second occurrence, should be deleted.

Column 2, lines 57 and 58, "which would actually be a constant frequency modulated signal which would a actually be a constant frequency" should be deleted.

Column 6, line 6, "he" should be --the--.

Column 6, line 20, "the at" should be --that--.

Column 6, line 30, "tuned" should be --turned--.

Column 6, line 60, "versus time" should be --versus-time--.

Column 7, line 16, "face" should be --fact--.

Column 8, line 27, "he" should be --the--.

Column 8, line 32, "of", second occurrence, should be deleted.

Column 8, line 40, "! fig." should be --FIG--.

Column 10, line 1, "16" should be --17--.

Column 10, line 18, "portion", second occurrence, should be deleted.

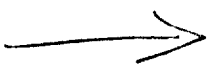

UNITED STATES PATENT OFFICE
CERTIFICATE OF CORRECTION

Patent No. 3,588,358          Dated June 28, 1971

Inventor(s) H. Wayne Rudmose and Nelson N. Estes

It is certified that error appears in the above-identified patent and that said Letters Patent are hereby corrected as shown below:

continued from page 1.

Column 10, lines 32 and 33, delete "repetitive sound signal having maximum and minimum peaks of".

Column 11, line 4, "hand-foldable" should be --hand-holdable--.

Column 11, line 41, "35" should be --34--.

Column 12, line 41, "52" should be --32--.

Signed and sealed this 8th day of February 1972.

(SEAL)
Attest:

EDWARD M. FLETCHER, JR.          ROBERT GOTTSCHALK
Attesting Officer                 Commissioner of Patents